3,043,821
POLYMERIZATION OF VINYL PHOSPHONATES USING ORGANOMETALLIC CATALYSTS
Harry W. Coover, Jr., and Marvin A. McCall, Kingsport, Tenn., assignors to Eastman Kodak Company, Rochester, N.Y., a corporation of New Jersey
No Drawing. Filed May 2, 1958, Ser. No. 732,438
10 Claims. (Cl. 260—89.5)

This invention provides a process for preparing a certain class of high molecular weight polymers of the broader class of vinyl phosphonates having the following general formula:

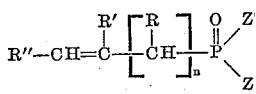

which monomeric vinyl phosphonates have hitherto been impracticable to homopolymerize when $n$ is 0. The essence of the invention centers around the unexpected ease with which such a homopolymerization can be achieved by using certain special catalysts such as aluminum triethyl, the sesquibromide of aluminum triethyl, lithium butyl, other metal alkyls and organometallic catalysts.

The catalysts known in the prior art for polymerizing vinyl polymers of various types are legion. When it comes to the phenomenon of catalysts the only thing that is certain is that laboratory experiments will be required to determine effective operability in a given system.

Thus, the fact that certain metal alkyls and other organometallic compounds derived from the metals of groups 1, 2 and 3 of the periodic table are useful in catalyzing the polymerization of certain olefinic compounds such as propylene is no assurance that all olefinic compounds can be effectively polymerized. Indeed, the fact that many common and well known catalysts do not produce homopolymers of the type with which this invention is concerned (where $n$ is 0 in the above general formula) is ample reason for the supposition that the general class of organometallic compounds including metal alkyls would be similarly valueless. Quite unexpectedly, it was found that this was not the case.

It is an object of this invention to provide a new process for polymerizing vinyl phosphonate compounds having the following general formula (same as above general formula but where $n$ is 0):

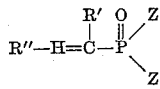

wherein R' and R'' each represent a substituent containing no more than 9 carbon atoms selected from the group consisting of a hydrogen atom, an alkyl radical, an alkoxy radical, an alkoxycarbonyl radical, a cyano radical and an aromatic hydrocarbon radical of the benzene series, at least one of R' and R'' being a hydrogen atom, and each Z represents a substituent containing no more than 6 carbon atoms selected from the group consisting of an alkoxy radical, a haloalkoxy radical (chloro, bromo or iodo substituted), and amino radical, a methylamino radical, an ethylamino radical, a dimethylamino radical, a methylethylamino radical and a diethylamino radical. In the first given general formula R would be defined in the same way as R' or R''.

It is another object of this invention to provide highly advantageous catalysts for use in the polymerization of said vinyl phosphonate compounds.

It is a further object to provide improved homopolymers of said vinyl phosphonate compounds.

It is another object to provide high molecular weight polymers of said vinyl phosphonates having intrinsic viscosities in 60% phenol and 40% tetrachloroethane of at least 0.6 and useful as tough molding compositions, as compatible additives to cellulose acetate dopes to be spun into modified acetate fibers having markedly reduced flammability, and as analogous additives for polyacrylonitrile dopes or for complex dope compositions including mixtures of graft copolymers of polymerized mono-olefinic compounds which may include polyvinylidene chloride, poly-N-isobutyroacrylamide, etc., the compatibility and markedly improved flame resistance so achieved being highly desirable.

Other objects are apparent elsewhere herein.

In accordance with the broad concept of this invention there is provided a process for polymerizing said vinyl phosphonate compounds having the second general formula given above ($n$ is 0) comprising agitating at from about −20° C. to about 120° C. said vinyl phosphonate with from about 0.1 to 10% by weight of said vinyl phosphonate of an organometallic catalyst.

Advantageously, said agitation can be conducted in an inert diluent which is liquid in the temperature range being employed. Such diluents are preferably organic compounds having up to 12 carbon atoms such as aliphatic and aromatic hydrocarbons containing from 4 to 12 carbon atoms, e.g. hexane, heptane, benzene, xylene, toluene, dialkyl ethers, ketones, dimethylformamide (DMF), alkanols, alkoxyalkyl ethers such as ethoxyethyl methyl ether, methoxyethylethanol, tetrachloroethane, phenol, acetone, methanol, ethylene glycol, etc. However, no such inert diluent is absolutely required if said vinyl phosphonate is a liquid so that it can be agitated at the temperature of the polymerization process.

The organometallic catalysts which are embraced within the concept of this invention include diethyl aluminum chloride and other related compounds having the formula R'''$_2$AlX, where R''' represents a member selected from the group consisting of a hydrogen atom and a hydrocarbon radical (preferably an alkyl radical containing from 1 to 10 carbon atoms), X may be selected from the group consisting of a hydrogen atom, a halogen atom, an alkoxy group, an aryloxy group, a secondary amine radical, a secondary acid amide radical, a mercaptan radical or a carboxylic or sulfonic acid radical. Such R''' radicals preferably include at least one alkyl radical and the X substituent preferably is a halogen atom such as chlorine, bromine, iodine or flourine. Advantageously, the catalysts which can be employed include those having the formula R'''$_3$Al; of this group the aluminum trialkyls can be most advantageously employed, however, R can also represent other hydrocarbon radicals. Such organometallic compounds can be used in combination with other compounds of metals in groups 4B, 5B, 6B, and 8 of the periodic table as well as manganese compounds (group 7 of the periodic table) or the free metals can be employed along with the organometallic compounds. Numerous references describe the organometallic catalysts and their use for polymerization of ethylene and other α-mono-olefins. These references include U.S. 2,786,860, U.S. 2,743,261, Belgian 533,362, Belgian 534,-792, Belgian 534,888 and numerous other patents and literature references known in the prior art.

In addition to the organo-aluminum compounds, other compounds can be similarly employed including lithium butyl, sodium amyl, sodium isopropoxide, sodium allyl, sodium naphthalene, potassim butyl, zinc diethyl, magnesium diehyl, etc. Although experiments made in accordance with the present invention indicate that any of the broad class or organometallic compounds can be employed, it is surprising that the most advantageous results are obtainable using aluminum triethyl. Hence, aluminum triethyl appears to represent an especially efficacious species of catalyst not merely equivalent to the other organometallic compounds which this invention covers in its broader considerations.

When using the preferred catalyst, aluminum triethyl, in accordance with an especially advantageous embodiment of this invention, it is preferable to use as the inert diluent, an aliphatic hydrocarbon containing from 5 to 9 carbon atoms such as heptane. The agitation of the said vinyl phosphonate compound in heptane using aluminum triethyl as the catalyst produces excellent homopolymers having tough resilient qualities and other desirable physical characteristics. The most advantageous intrinsic viscosities can also be achieved using this preferred embodiment of the invention. Thus, intrinssic viscosities of 0.75 can be readily produced. Somewhat similar results can also be obtained using benzene as the inert diluent. However, the aliphatic hydrocarbons appear to be generally more advantageous.

Although the present invention provides the unobvious and improved homopolymers of said vinyl phosphonates, the catalysts used in preparing such homopolymers can obviously be used in preparing copolymers and the process of this invention contemplates both homopolymers and copolymers. Since copolymers are well known in the art, there is no need in this specification for a lengthy discussion of what copolymers can be prepared using the process of this invention. Examples of some of the compounds which can be copolymerized include those having the first named general formula in this specification wherein n is one or more. Such compounds include allyl and substituted allyl phosphonates (see Example 7 hereinbelow).

This invention can be further illustrated by the following examples of preferred embodiments although it will be understood that these examples are included merly for purposes of illustration and are not intended to limit the scope of the invention unless otherwise specifically indicated.

*Example 1*

Diethyl vinyl phosphonate $(C_2H_5O)_2P(O)CH=CH_2$, 30 g. and 30 cc. of dry heptane were placed in a 3-necked flask equipped with dropping funnel, condenser, and stirrer. The top of the condenser was equipped with a drying tube. The dropping funnel was so modified as to allow dry nitrogen gas to blanket the contents of the drooping funnel and to flow over the contents of the 3-necked flask throughout the addition and reaction period. To the stirred solution of diethyl vinyl phosphonate was added dropwise 0.75 g. of aluminum triethyl in 3 cc. of dry heptane. The reaction was exotheric and was stirred vigorously for 30 to 40 minutes or until the reaction was cool. An addition quantity, 0.75 g., of aluminum triethyl was then added dropwise with stirring. Polymer began to form and the reaction became viscous, forming a second layer in the heptane solution. After the heat of the polymerization had subsided, the mixture was heated to reflux for 2 to 3 hours. The polymer was obtained by separating the heptane and then by heating in a vacuum oven or circulating air oven at 80° C. to remove the remaining heptane solvent. The polymer was a very tough, rubbery mass when dry. It was soluble in methyl alcohol and acetone. It formed useful solutions with acetone and water or methyl alcohol and water. These solutions foamed and had surface active properties. Somewhat analogous results were obtained with this same monomer when the catalyst was sodium naphthalene, lithium butyl, or sodium amyl used in concentrations within a 4 to 8% concentration range based on the amount of monomer employed. The polymers were tough, elastomeric products useful as molding compositions, films, surface coatings, wrapping materials, paper impregnants, etc.

Although the use of the catalysts other than aluminum triethyl produced useful homopolymers, the aluminum triethyl appears to be most advantageous since consistent results achieving intrinsic viscosities of 0.75 or more can be achieved.

*Example 2*

A polymerization similar to that described in Example 1 was carried out using aluminum triethyl (2.5% based on monomer) with diethyl vinyl phosphonate at 0° C. using an ice and water bath. The polymerization mixture was stirred at 0° C. for 6 or 8 hours and was then allowed to warm to room temperature slowly. This polymer had an inherent viscosity of 0.97 in a 60% phenol–40% tetrachloroethane mixture. It was soluble in methyl alcohol, water and acetone. Smooth dopes could be prepared, which were compatible with cellulose acetate dopes, and from which clear films were cast. A tough, rubbery button was compression molded at 360° F. and 10,000 p.s.i. Somewhat similar results were obtained when the catalyst was phenyl magnesim bromide.

*Example 3*

Bis(β-chloroethyl) vinyl phosphonate was polymerized in a similar manner to that described in Example 1 except that dry benzene was used as the solvent. The polymer was insoluble in methyl alcohol and was processed by pouring the polymer solution into a Waring Blendor containing methyl alcohol. The finely divided polymer was filtered and dried. The yield of polymer based on monomer used was 80%. It was insoluble in acetone and methyl alcohol. It had an inherent viscosity of 0.75 in 60% phenol–40% tetrachloroethane solution. Hard, somewhat brittle buttons were prepared by compression molding at 490° F. and 14,000 p.s.i. A 10% solution of this polymer in DMF was spun into a water bath to give fibers.

Although dry benzene can be successfully used as the inert diluent as illustrated in Example 3, it appears that especially advantageous results can be achieved using an aliphatic hydrocarbon as illustrated by Examples 1, 2, 5, 6 and 7.

*Example 4*

Diethyl isopropenyl phophonate,

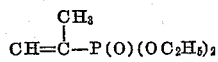

was also polymerized in a similar manner to that described in Example 1 except that no solvent was used. It was insoluble in all the common organic solvents and also insoluble in 60% phenol–40% tetrachloroethane solution. Similar results were obtained when the catalyst was (1) triethyl aluminum sesquibromide, $Al_2Br_3(C_2H_5)_3$, (2) lithium butyl, or (3) alphin type catalyst which consisted of a mixture of sodium amyl, sodium chloride, sodium isopropoxide, sodium allyl and pentane.

Although the process described in Example 4 produces valuable homopolymers, the absence of an inert diluent makes it difficult to control the ultimate product.

*Example 5*

Methyl ester of β-diethylphosphonoacrylate,

was polymerized in a similar manner to that described in Example 1 to give a white solid polymer when aluminum triethyl or a suspension of sodium amyl in benzene was used in amounts equal to 6% based on monomer used.

*Example 6*

N,N′-tetramethyl isopropenyl phosphondiamide,

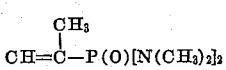

was polymerized to a solid slightly yellow polymer when (1) aluminum triethyl, (2) triethyl aluminum sesquibromide, or (3) zinc diethyl were used as the catalyst. All of these catalysts were used in concentrations within a 4 to 8% range based on monomer present.

*Example 7*

In the same manner as described in Example 1 above, the following monomers were polymerized with aluminum triethyl catalyst:

(a) Diethyl allylphosphonate.
(b) Diethyl α-phenylvinylphosphonate.
(c) Diethyl β-phenylvinylphosphonate.
(d) N,N'-tetraethyl 2-cyanoallylphosphonic diamide.
(e) Diethyl 2-cyanoallylphosphonate.
(f) Diethyl 2-methylallylphosphonate.

The preceding Example 7 shows that the polymers which can be prepared using the catalysts contemplated by this invention include those compounds wherein $n$ in the first named formula hereinabove can also be a positive integer. Copolymers of the compounds set forth in Examples 1–6 with those of Example 7 are also contemplated by this invention; however, the most unobvious aspect of this invention relates to the fact that the homopolymers of those compounds wherein $n$ is 0 can be produced in a surprisingly efficacious manner.

This invention in its especially preferred form provides a process for preparing a high molecular weight homopolymer (having an intrinsic viscosity of at least 0.75) of a vinyl phosphonate having the last general structural formula given hereinabove comprising agitating at about from −20° C. to about 120° C., said vinyl phosphonate with from about 1 to 5% by weight of said vinyl phosphonate of aluminum triethyl in the presence of an aliphatic hydrocarbon containing from 5 to 9 carbon atoms until the heat of polymerization has subsided, heating the mixture under reflux conditions for from 1 to 7 hours and then removing the aliphatic hydrocarbon.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for preparing a polymerized 1-alkenyl phosphonate having an intrisic viscosity of at least 0.6 comprising agitating in an inert diluent at from about −20° C. to about 120° C., a vinyl phosphonate compound having the following general formula:

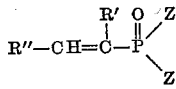

wherein R' and R'' each represent a substituent containing no more than 9 carbon atoms selected from the group consisting of a hydrogen atom, an alkyl radical, an alkoxy radical, an alkoxycarbonyl radical, a cyano radical and an aromatic hydrocarbon radical of the benzene series, at least one of R' and R'' being a hydrogen atom, and each Z represents a substituent containing no more than 6 carbon atoms selected from the group consisting of an alkoxy radical, a chloroalkoxy radical, a bromoalkoxy radical, an iodoalkoxy radical, an amino radical, a methylamino radical, an ethylamino radical, a dimethylamino radical, a methylethylamino radical and a diethyl amino radical, with from about 0.1 to 10% by weight of the vinyl phosphonate of a metal alkyl compound as the sole catalytically active compound, said metal alkyl being selected from the group consisting of a lithium alkyl, a sodium alkyl, a potassium alkyl, a magnesium dialkyl, a zinc dialkyl and an aluminum trialkyl wherein each alkyl radical contains from 1 to 10 carbon atoms.

2. A process as defined in claim 1 wherein the catalyst is aluminum trialkyl.

3. A process as defined in claim 1 wherein the inert diluent is heptane.

4. A process as defined by claim 2 for preparing a high molecular weight homopolymer (having an intrinsic viscosity of at least 0.75) of a 1-alkenyl phosphonate employing from about 1 to 5% by weight of said 1-alkenyl phosphonate of aluminum triethyl in the presence of an aliphatic hydrocarbon containing from 5 to 9 carbon atoms as said inert diluent until the heat of polymerization has subsided, heating the mixture under reflux conditions for from 1 to 7 hours and then removing the aliphatic hydrocarbon.

5. A process as defined in claim 4 wherein the inert diluent is heptane.

6. A process as defined in claim 5 wherein the 1-alkenyl phosphonate is diethyl vinyl phosphonate.

7. A process as defined in claim 5 wherein the 1-alkenyl phosphonate is bis(β-chloroethyl) vinyl phosphonate.

8. A process as defined in claim 5 wherein the 1-alkenyl phosphonate is diethyl isopropenyl phosphonate.

9. A process as defined in claim 5 wherein the 1-alkenyl phosphonate is the methyl ester of β-diethylphosphono acrylate.

10. A process as defined in claim 5 wherein the 1-alkenyl phosphonate is N,N'-tetramethyl isopropenyl phosphondiamide.

References Cited in the file of this patent

UNITED STATES PATENTS

| | | |
|---|---|---|
| 2,439,214 | Lindsey | Apr. 6, 1948 |
| 2,559,854 | Dickey et al | July 10, 1951 |
| 2,636,027 | Coover et al. | Apr. 21, 1953 |
| 2,671,106 | Albisetti et al. | Mar. 2, 1954 |
| 2,743,261 | Coover et al. | Apr. 24, 1956 |
| 2,780,616 | Dickey et al. | Feb. 5, 1957 |
| 2,818,406 | Short | Dec. 31, 1957 |
| 2,827,475 | Coover et al. | Mar. 18, 1958 |
| 2,841,574 | Foster | July 1, 1958 |
| 2,854,434 | Beaman | Sept. 30, 1958 |
| 2,871,263 | Short | Jan. 27, 1959 |